US012663545B2

(12) United States Patent
Park

(10) Patent No.: US 12,663,545 B2
(45) Date of Patent: Jun. 23, 2026

(54) CONVOLUTIONAL NEURAL NETWORK BASED ON CHANNEL-SPECIFIC CONVOLUTION FOR HIGH-SPEED OBJECT RECOGNITION OF 3D LiDAR

(71) Applicant: CHUNGBUK NATIONAL UNIVERSITY INDUSTRY ACADEMIC COOPERATION FOUNDATION, Chungcheongbuk-do (KR)

(72) Inventor: Tae Hyoung Park, Chungcheongbuk-do (KR)

(73) Assignee: CHUNGBUK NATIONAL UNIVERSITY INDUSTRY-ACADEMIC COOPERATION FOUNDATION, Chungcheongbuk-do (KR)

( * ) Notice: Subject to any disclaimer, the term of this patent is extended or adjusted under 35 U.S.C. 154(b) by 607 days.

(21) Appl. No.: 17/419,788

(22) PCT Filed: Nov. 25, 2020

(86) PCT No.: PCT/KR2020/016791
§ 371 (c)(1),
(2) Date: May 17, 2023

(87) PCT Pub. No.: WO2022/097814
PCT Pub. Date: May 12, 2022

(65) Prior Publication Data
US 2023/0280467 A1     Sep. 7, 2023

(30) Foreign Application Priority Data

Nov. 9, 2020     (KR) ........................ 10-2020-0148870

(51) Int. Cl.
*G01S 17/894* (2020.01)
*G06V 10/44* (2022.01)
(Continued)

(52) U.S. Cl.
CPC ............ *G01S 17/894* (2020.01); *G06V 10/44* (2022.01); *G06V 10/764* (2022.01);
(Continued)

(58) Field of Classification Search
CPC ........ G06N 3/0464; G06N 3/045; G06N 3/04; G06V 10/82; G06V 10/454; G06V 10/764; G06V 10/7715
See application file for complete search history.

(56) References Cited

U.S. PATENT DOCUMENTS

2018/0348374 A1* 12/2018 Laddha ................. G01S 17/931

FOREIGN PATENT DOCUMENTS

KR          10-2168753 B1     10/2020

OTHER PUBLICATIONS

Translation of KR 20190038137 to Shounan et al. (Sho), (Year: 2019).*
Translation, Sho (Year: 2019).*

* cited by examiner

*Primary Examiner* — Kenneth J Malkowski
(74) *Attorney, Agent, or Firm* — Harness, Dickey & Pierce, P.L.C.

(57)          ABSTRACT

Provided is a convolutional neural network structure based on channel-specific convolution for high-speed object recognition of a 3D LiDAR, including: an inside-channel convolutional network for extracting features in channels of a LiDAR data; an outside-channel convolutional network for extracting features between the channels by using outputs for the channels of the inside-channel convolutional network
(Continued)

(a)

and generating a feature map representing the extracted features between the channels; and a detection network searching location and class of an object by using the feature map generated from the outside-channel convolutional network. According to the invention, since a raw data coming from a LiDAR is directly used in a high-speed object recognition procedure of a 3D LiDAR, there is an effect that data loss does not occur.

1 Claim, 5 Drawing Sheets

(51) Int. Cl.
    *G06V 10/764*         (2022.01)
    *G06V 10/771*         (2022.01)
    *G06V 10/82*          (2022.01)
(52) U.S. Cl.
    CPC ............ *G06V 10/771* (2022.01); *G06V 10/82* (2022.01); *G06V 2201/07* (2022.01)

(a)  (b)

(b)

(a)

(b)

CONVOLUTIONAL NEURAL NETWORK BASED ON CHANNEL-SPECIFIC CONVOLUTION FOR HIGH-SPEED OBJECT RECOGNITION OF 3D LiDAR

CROSS-REFERENCE TO RELATED APPLICATION

This application is a national phase application of PCT Application No. PCT/KR2020/016791, filed on 25 Nov. 2020, which claims benefit of Korean Patent Application 10-2020-0148870, filed on 9 Nov. 2020. The entire disclosure of the applications identified in this paragraph are incorporated herein by reference.

FIELD

The invention relates to a convolutional neural network, and more particularly, to a convolutional neural network structure based on channel-specific convolution for high-speed object recognition of a 3D LiDAR.

BACKGROUND

A 3D LiDAR is a sensor widely used in autonomous vehicles. The 3D LiDAR is a device that measures the distance of a nearby object based on the time taken by laser emitted form a main body of the LiDAR to be reflected to returned. Unlike a camera, the LiDAR is less affected by light, so that the LiDAR can detect nearby objects irrespective of day or night.

The LiDAR data is configured with a set of points, and the set of points is called a point cloud. Each point includes a location (x, y, z) data and reflectivity (I) data.

From an output LiDAR data, is can be confirmed that there are a background and an object configured with several points. A series of procedures to find a location and class of an object (mainly, a person or a car) in a LiDAR data is called object recognition.

There are several object recognition methods using a 3D LiDAR, but in recent years, in terms of performance, the best method is to use a convolutional neural network (CNN).

When an input data comes in, the CNN extracts features through several times of convolution procedure and recognizes the objects by using the extracted features. In the related art, the CNN converts 3D LiDAR data into voxel or image and uses the voxel or image as the input data. The object recognition procedure of the CNN in the related art is illustrated in FIG. 1.

FIG. 1 illustrates an object recognition procedure using the CNN in the related art.

Referring to FIG. 1, the object recognition procedure using the CNN in the related art is a method of converting a point cloud data detected in the LiDAR into a voxel or an image, performing the CNN with the converted data as an input, outputting a result data.

The object recognition method using CNN in the related art has various problems depending on the conversion method. However, a common problem among the problems is that a raw data generated through the LiDAR is converted, so that data loss occur.

The disadvantages of the voxel conversion method and the image conversion method in the related art are as follows.

First, in the case of the method of converting a point cloud to a voxel, 3D convolution is required to be used, but there is a problem that an amount of computation increases, which affects an execution time.

In addition, in the case of converting a point cloud to an image, since 2D data is used as an input data, the output data is related to the 2D data, and thus, there is a problem that additional algorithm is applied in order to find an accurate 3D posture.

In order to improve the methods in the related art, it is necessary to eliminate the procedure for converting the point cloud into the voxel or image.

Examples of related art include Korean Patent No. 10-2168753.

SUMMARY

The invention is to provide a convolutional neural network structure based on channel-specific convolution to omit a procedure for converting a point cloud data into a voxel or an image in a high-speed object recognition procedure of a 3D LiDAR.

Objects of the invention are not limited to the objects mentioned above, and other objects not mentioned will be clearly understood by those skilled in the art from the following description.

According to the invention, there is provided a convolutional neural network structure based on channel-specific convolution for high-speed object recognition of a 3D LiDAR, including: an inside-channel convolutional network for extracting features in channels of a LiDAR data; an outside-channel convolutional network for extracting features between the channels by using outputs for the channels of the inside-channel convolutional network and generating a feature map representing the extracted features between the channels; and a detection network searching location and class of an object by using the feature map generated from the outside-channel convolutional network.

In the inside-channel convolutional network, one or more convolution layers for performing convolution for each channel and a pooling layer for performing pooling may be set as one set, a predetermined number of sets may be successively provided, a channel data of the LiDAR may be input for each channel, and a feature data representing the feature of each channel may be output.

In the outside-channel convolutional network, one or more convolution layers for performing convolution by inputting an input feature map in which the feature data for the channels are combined may be provided, and a final feature map obtained by connecting the input feature map and a resultant feature map which is a result of the convolution layer may be output.

The detection network may include one or more convolution layers for performing convolution with the resultant feature map as input, a class layer for outputting class and score of an object by using a result data coming out through the convolution layer, and a box layer for displaying a location of the object, a size of a box, and an angle of the object by using the result data coming out through the convolution layer.

According to the invention, since the raw data coming from the LiDAR is directly used in the high-speed object recognition procedure of the 3D LiDAR, there is an effect that data loss does not occur.

In addition, according to the invention, since the channel in the original LiDAR is used rather than a method of converting point cloud data, a conversion algorithm is not required. In the case of the inside-channel convolutional network, since the convolution is applied only to data in the same channel, there is an effect that the processing speed is high because the dimension of the convolution is low.

DETAILED DESCRIPTION

Figure 1:
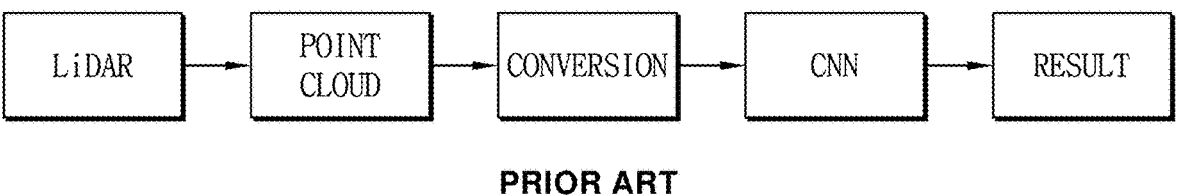
FIG. 1 illustrates an object recognition procedure using an CNN in the related art.

Advantages and features of the embodiments disclosed herein and methods for achieving the advantages and features will be clarified by referring to the embodiments described below with reference to the accompanying drawings. However, the embodiments proposed in the disclosure are not limited to the embodiments disclosed below, but may be implemented in a variety of different forms, and only the embodiments are provided to completely describe the scope of the embodiments to those ordinary skilled in the art.

The terms used in this specification will be briefly described, and the disclosed embodiments will be described in detail.

As the terms used in the specification, general terms that are currently widely used as possible are selected while considering the functions of the disclosed embodiments, but these terms may vary depending on the intention of a technician or precedent in the related field, the emergence of new technology, or the like. In addition, in certain cases, there are also terms arbitrarily selected by the applicant, and in these cases, the meaning will be described in detail in the detailed description of the corresponding specification. Therefore, the term used in the disclosure is defined based on the meaning of terms and contents in the entire specification, rather than a simple name of the term.

In this specification, singular expressions include plural expressions unless the context clearly specifies the singular expression.

In the entire specification, "a portion includes a certain element" denotes that the portion may further include other elements rather than excluding the other elements, unless otherwise stated. Also, as used herein, the term "unit" refers to a hardware component such as software, FPGA, or ASIC, and "unit" performs a certain role. However, "unit" is not meant to be limited to software or hardware. The "unit" may be configured to reside on an addressable storage medium and may be configured to reproduce one or more processors. Thus, as an example, "unit" includes components such as software components, object-oriented software components, class components and task components, processes, functions, attributes, procedures, subroutines, segments of program code, drivers, firmware, microcodes, circuits, data, databases, data structures, tables, arrays, and variables. The functions provided in the components and the "units" may be combined into a smaller number of components and "units" or further divided into additional components and "units".

In addition, in the description with reference to the accompanying drawings, the same components regardless of the reference numerals are denoted by the same reference numerals, and the redundant description thereof will be omitted. In describing the invention, when it is determined that detailed description of a related known technology may unnecessarily obscure the spirit of the invention, the detailed description thereof will be omitted.

Figure 2:
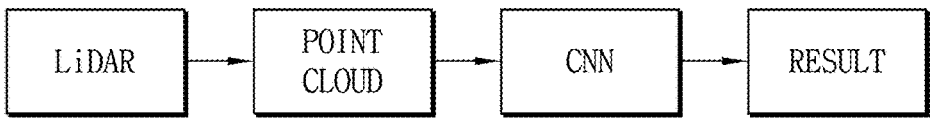
FIG. 2 illustrates a high-speed object recognition procedure of a 3D LiDAR according to an embodiment of the invention.

FIG. 2 illustrates a high-speed object recognition procedure of a 3D LiDAR according to an embodiment of the invention.

Referring to FIG. 2, in the high-speed object recognition procedure of the 3D LiDAR according to one embodiment of the invention, by inputting the point cloud data detected in the LiDAR and performing a convolutional Neural Network (CNN), the result data is output.

In the high-speed object recognition procedure of the 3D LiDAR using the CNN of the invention, the procedure for converting the point cloud data into the voxel or the image is omitted in comparison with the method in the related art. Therefore, the invention proposes a convolutional neural network structure based on the following channel-specific convolution.

Figure 3:
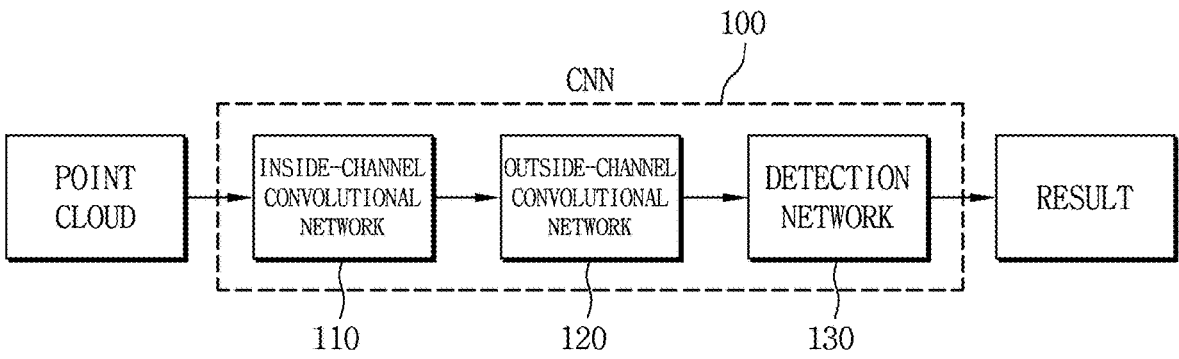
FIG. 3 is a diagram illustrating a convolutional neural network structure based on channel-specific convolution for high-speed object recognition of the 3D LiDAR according to the embodiment of the invention.

FIG. 3 is a diagram illustrating a convolutional neural network structure based on channel-specific convolution for high-speed object recognition of the 3D LiDAR according to the embodiment of the invention.

Referring to FIG. 3, a convolutional neural network structure 100 based on channel-specific convolution for high-speed object recognition of a 3D LiDAR proposed in the invention is configured with a total of three networks including an inside-channel convolutional network 110 for extracting features in channel of a LiDAR data, an outside-channel convolutional network 120 for extracting features between the channels of the LiDAR, and a detection network 130 for finding location and class of an object.

The inside-channel convolutional network 110 is a network for extracting features in the channels.

Before describing the configuration of the inside-channel convolutional network 110, the features of the LiDAR data will be described as follows.

FIG. 4 is a diagram illustrating a method of displaying point cloud data.

Figure 4A:
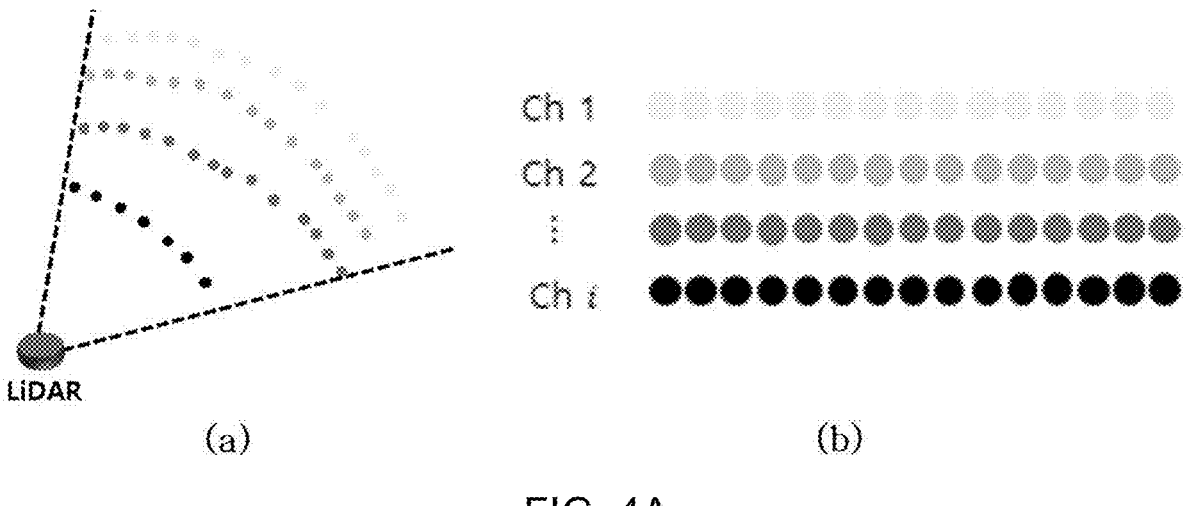
FIGS. 4A and 4B are a diagram illustrating a method of displaying point cloud data.
Figure 4B:
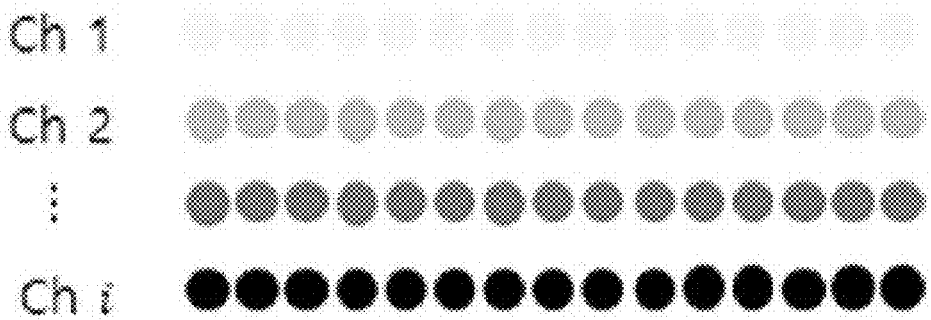

FIG. 4A illustrates the output data of the point cloud which is the LiDAR data, and FIG. 4B illustrates an alignment data obtained by aligning the output data. That is, FIG. 4A illustrates the LiDAR data output according to the distance, and FIG. 4B illustrates alignment data in which the LiDAR data are aligned.

The LiDAR data L is configured as follows.

$$L = p_{i,j}$$

$$p_{i,j} = \{x_{i,j}, y_{i,j}, z_{i,j}, l_{i,j}\} \tag{1}$$

The alignment data illustrated in FIG. 4B is expressed by a formula as follows.

$$L = [C_1 C_2 \ldots C_i]^T \qquad (2)$$

$$C_i = [p_{i,1} p_{i,2} \ldots p_{i,j}]$$

Herein, L denotes the entire LiDAR data, i denotes a channel, $C_i$ denotes a set of points belonging to channel i, j denotes an index in each channel, and $p_{i,j}$ denotes one point. $p_{i,j}$ contains a location (x, y, z) and a reflectivity (I) value.

Since the LiDAR has a low vertical resolution but the horizontal resolution is high, points in the same channel have a lot of similarity. This will be described with reference to the drawings, as follows.

FIG. 5 is an exemplary diagram illustrating an object detection method of the LiDAR.

Figure 5A:
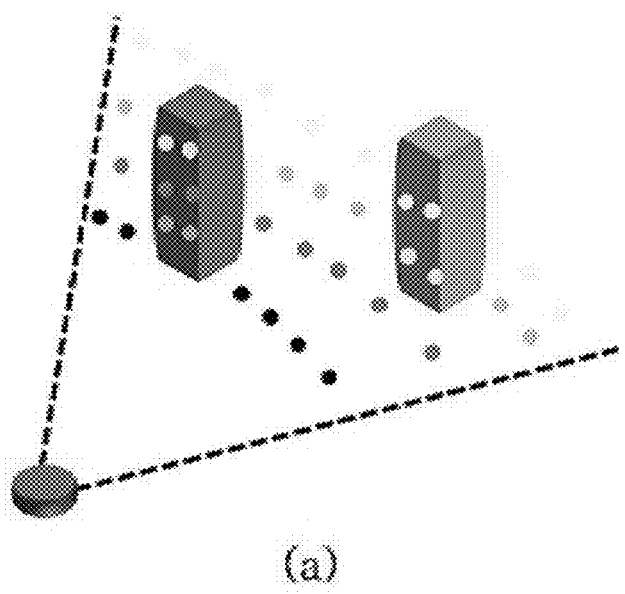
FIGS. 5A and 5B are a diagram illustrating an object detection method of a LiDAR.
Figure 5B:
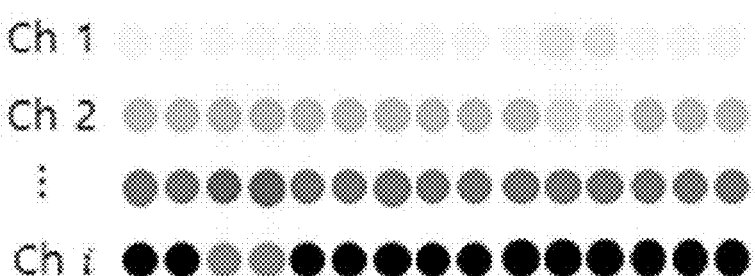

In the example of FIG. 5, when the LiDAR detects two objects, and the data measured by the LiDAR in FIG. 5A are aligned, as illustrated in FIG. 5B, in case of the LiDAR data in the same channel (i is the same), the distance and reflectivity value are changed in the portion where the object is recognized during the ground measurement. Since the ground is measured when the object area is passed, the distance and reflectivity values are changed again. If there are other objects in a row, the distance is the same, but there occurs a difference in reflectivity, so that the corresponding object information can be obtained through this.

In the case of the LiDAR where 360° scan can be implemented, points in the same channel have a lot of similarity. For example, when flat ground is scanned, the distance and reflectivity values of the LiDAR data in the same channel are similar. However, as in FIG. 5A, when there is an object, in some cases, the distance or reflectivity value may be different in the middle. Therefore, since the data for each channel has a deep relationship with each other, the data are separated for each channel. Then, the inside-channel convolution is performed by using the separated channel data.

Figures 6, 7:
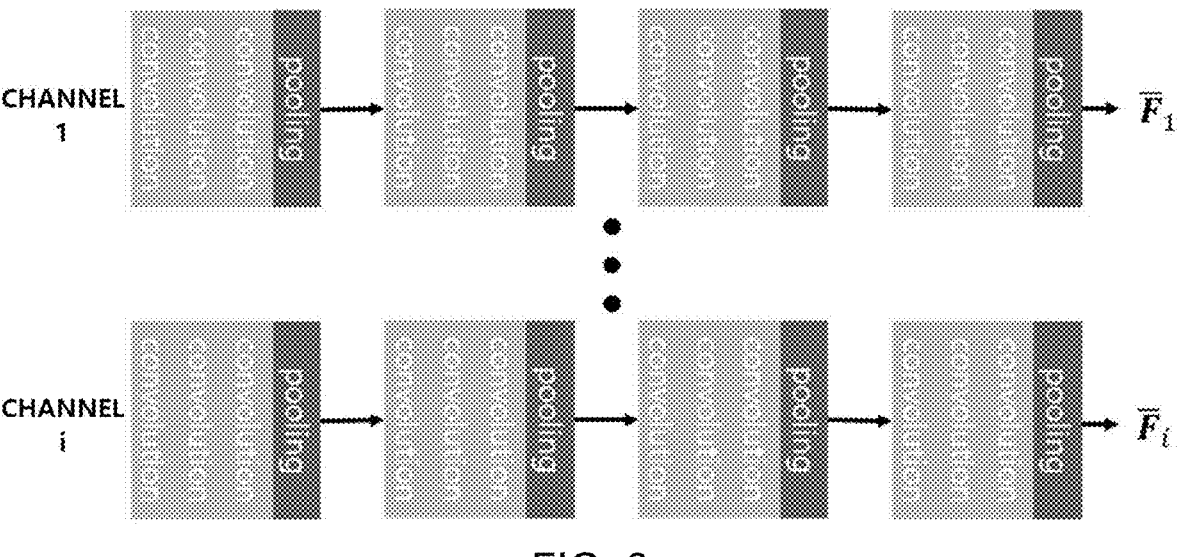
FIG. 6 illustrates a configuration of an inside-channel convolutional network in the convolutional neural network structure according to the embodiment of the invention.
FIG. 7 illustrates a configuration of an outside-channel convolutional network in the convolutional neural network structure according to the embodiment of the invention.

The inside-channel convolutional network can be illustrated by using the channel features of such a LiDAR as illustrated in FIG. 6.

FIG. 6 illustrates the configuration of the inside-channel convolutional network in the convolutional neural network structure according to the embodiment of the invention.

In FIG. 6, $\overline{F_i}$ is the feature data output from the channel i.

In the embodiment of FIG. 6, it can be confirmed that the inside-channel convolutional network 110 is configured with twelve convolution layers and four pooling layers for each channel. In addition, the inside-channel convolutional network 110 includes 12×i convolution layers and 4×i pooling layers.

The size of the convolution mask of the convolution layer is configured with 1×3. The convolution is performed on the x, y, z, and I values of the LiDAR data for each LiDAR channel. Three convolutions and one pooling is set as one set, and a total of four sets are performed.

Next, the outside-channel convolutional network 120 is a network for extracting the features between the channels. As FIG. 5B is viewed in the vertical direction, it can be confirmed that the ground is detected when the object is continuously detected and then the object disappears. In other words, this denotes that the feature of the object can be selected even when there are the same index (j is the same).

The outside-channel convolutional network can be represented by using the features between the channels as illustrated in FIG. 7.

FIG. 7 illustrates the configuration of the outside-channel convolutional network in the convolutional neural network structure according to the embodiment of the invention.

In FIG. 7, the outside-channel convolutional network 120 generates a feature map F" by using $\overline{F_i}$ output from the inside-channel convolutional network as an input.

As illustrated in FIG. 7, in the embodiment of the invention, the outside-channel convolutional network 120 is configured with three convolution layers. The size of the mask of the convolution layer is 3×3. At the end of the outside-channel convolutional network 120, a new feature map F" is generated by connecting the convolution result, the feature map F', and the feature map F used as an input.

The input data of the outside-channel convolutional network 120 uses one F obtained by combining the results $(\overline{F_1}, \overline{F_2}, \ldots, \overline{F_i})$ of the inside-channel convolutional network, the output data is F", and the size of the feature map is the same as F.

Next, the detection network 130 is a network that finds the location and class of the object by using the feature map F" obtained from the outside-channel convolutional network 120.

Figure 8:
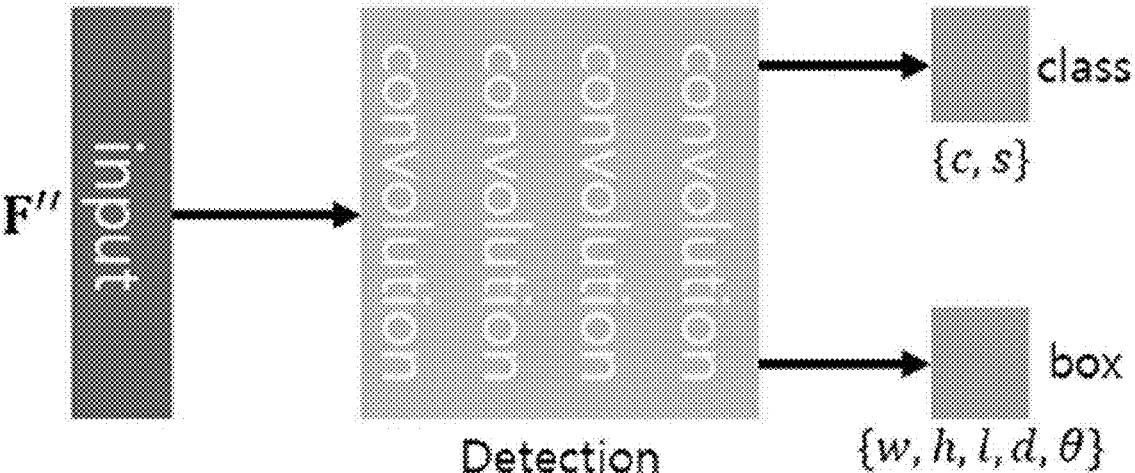
FIG. 8 illustrates a configuration of a detection network in the convolutional neural network structure according to the embodiment of the invention.

FIG. 8 illustrates the configuration of the detection network in the convolutional neural network structure according to the embodiment of the invention.

Referring to FIG. 8, the detection network 130 is configured with a class layer that outputs the class and score (c, s) of the object and a box layer that finds out the location, size, and rotation (w, h, I, d, θ) of the object.

In the embodiment of FIG. 8, the detection network 130 has four convolution layers, and the size of the mask is 3×3. And, in the detection network 130, a final data, which comes out through the four convolution layers, is used as an input for the class layer and the box layer.

The class layer is configured to output the class and score (c, s) of the object. And, the box layer is configured to display the location of the object, the size of the box, and the angle (w, h, I, d, θ) of the object.

In the invention, a convolutional neural network structure based on channel-specific convolution based on the LiDAR channel is proposed. In the related art, an object recognition method using 3D convolution or converting data is used, but the method proposed in the invention is a network that recognizes the object by using the features of the LiDAR data. That is, in the method, the inside-channel convolutional network is used to extract the features from the LiDAR data for each channel for object recognition, the features between the channels are extracted by using the outside-channel convolutional network, and finally the object is detected by using the detection network.

In the object recognition procedure of the 3D LiDAR in the related art, voxel conversion or image conversion method is required to eventually convert the LiDAR data to be used as the input data of the network. However, due to the data conversion, some of the raw data may be eventually lost, and since a conversion algorithm or post-processing algorithm for the data conversion needs to be added, and the 3D convolution is used only for voxel, the execution time becomes long.

In order to improve this problem, in the case of the method proposed in the invention, since the raw data coming from the LiDAR is directly used, data loss does not occur.

Since the channel in the original LiDAR is used instead of the data conversion, the conversion algorithm is not needed. In addition, in the case of the inside-channel convolutional network, since the convolution is applied to only the data in the same channel, the dimension of convolution is low, and the processing speed is high.

While the invention has been described above using several preferred embodiments, the embodiments are illustrative and not restrictive. The ordinary skilled in the art to which the invention belongs will understand that various changes and modifications can be made without departing from the spirit and scope of the invention disclosed in the appended claims.

What is claimed is:

1. A convolutional neural network structure based on channel-specific convolution for high-speed object recognition of a 3D LiDAR, the 3D LiDAR providing a point cloud of LiDAR data in a plurality of channels, the convolutional neural network structure comprising:

a first convolutional network for extracting features in the channels of the LiDAR data, wherein the LiDAR data is represented by $L=[C_1, C_2 \ldots C_i]^T$, where $C_i=[p_{i,1} \ p_{i,2} \ \cdots \ p_{i,j}]$ and $p_{i,j}=\{x_{i,j}, \ y_{i,j}, \ z_{i,j}, \ I_{i,j}\}$, wherein L denotes the entire LiDAR data, i denotes a channel, $C_i$ denotes a set of points belonging to channel i, j denotes an index in each channel, and $p_{i,j}$ denotes one point, and each $p_{i,j}$ contains a location (x, y, z) value and a reflectivity (1) value, wherein the first convolutional network includes twelve convolutional layers and four pooling layers for each channel (i) of the plurality of channels, each convolutional layer of the first convolutional network includes a convolution mask having a size of 1×3, convolution is performed on the location (x, y, z) and reflectivity (I) values of the LiDAR data for each channel, three convolutions layers of the twelve convolutional layers and one pooling layer of the four pooling layers are stacked in each set, and a total of four sets of convolution is performed, the first convolutional network configured to, receive the point cloud of LiDAR data in the plurality of channels from the 3D LiDAR, each channel of the plurality of channels including a set of points, each point of the set of points containing a portion of the LiDAR data, and separately extract, from the point cloud of LiDAR, first feature data in each individual channel of the plurality of channels, wherein the first feature data in each individual channel (i) of the plurality of channels is represented by $F_j$:

a second convolutional network different than the first convolutional network and connected to the first convolutional network, wherein the second convolutional network includes three convolutional layers and each convolutional layer of the second convolutional network includes a convolution mask having a size of 3×3, the second convolutional network configured to, receive a combined feature set (F) corresponding to a combination of the first feature data ($F_j$) extracted in each channel of the plurality of channels, extract second feature data from two or more channels of the plurality of channels based on the combined feature set, and generate a feature map (F") based on the extracted second feature data from the two or more channels of the plurality of channels from the second convolutional network and the received combined feature set corresponding to the combination of the first feature data extracted in each channel of the plurality of channels from the first convolutional network; and a detection network connected to the second convolutional network, wherein the detection network includes four convolution layers, a class layer and a box layer for displaying a location of the object, and each convolutional layer of the detection network includes a convolution mask having a size of 3×3, the detection network configured to, receive the feature map generated from the second convolutional network, and search location and class of an object by using the feature map generated from the second convolutional network, wherein the class layer is configured to output a class and score of an object by using a result data coming out through the four convolution layers and the box layer is configured to display a location of the object, a size of a box, and an angle of the object by using the result data coming out through the four convolution layers.

* * * * *